(12) United States Patent
Chen

(10) Patent No.: US 8,106,532 B2
(45) Date of Patent: Jan. 31, 2012

(54) ILLUMINATION DEVICE OF GRADUAL DIMMING TYPE AFTER POWER INTERRUPTION

(76) Inventor: Hon-Wen Chen, Yilan (TW)

( * ) Notice: Subject to any disclaimer, the term of this patent is extended or adjusted under 35 U.S.C. 154(b) by 328 days.

(21) Appl. No.: 12/385,926

(22) Filed: Apr. 24, 2009

(65) Prior Publication Data
US 2010/0270861 A1    Oct. 28, 2010

(51) Int. Cl.
*H02J 3/06*    (2006.01)
(52) U.S. Cl. .......................................................... 307/66
(58) Field of Classification Search .............. 307/64–66; 315/291, 307, 209 R, 219, 199, 360
See application file for complete search history.

(56) References Cited

U.S. PATENT DOCUMENTS

| | | | | |
|---|---|---|---|---|
| 5,030,890 A | * | 7/1991 | Johnson | ........................ 315/208 |
| 5,245,253 A | * | 9/1993 | Quazi | ........................... 315/224 |
| 5,798,620 A | * | 8/1998 | Wacyk et al. | ................. 315/307 |
| 6,717,367 B2 | * | 4/2004 | Tabell | ............................ 315/86 |
| 6,949,885 B2 | * | 9/2005 | Hamamoto et al. | ...... 315/200 R |

\* cited by examiner

*Primary Examiner* — Albert W Paladini
(74) *Attorney, Agent, or Firm* — Rosenberg, Klein & Lee

(57) ABSTRACT

This invention relates to an illumination device of gradual dimming after power interruption in which a built-in power storage unit and a gradual-dimming light intensity drive control unit are provided within the lamp body, the light emitting source of the illumination device being normally lightened by city power, the built-in power storage unit being charged by the city power simultaneously. When city power is interrupted, the power is switched to be supplied with the power coming from the built-in power storage unit and the gradual-dimming light intensity drive control unit is activated to control the gradual dimming of light intensity of the light emitting source. In this manner, the effect of energy saving and extension of illumination time can be obtained such that eyes of people can adapt to the light intensity change. In addition, the illumination device is safe and is convenient in use without any indoor wiring change or additional member added.

20 Claims, 6 Drawing Sheets

ILLUMINATION DEVICE OF GRADUAL DIMMING TYPE AFTER POWER INTERRUPTION

BACKGROUND OF THE INVENTION

1. Field of the Invention

This invention relates to an illumination device of gradual dimming after power interruption, particularly to an illumination device having a built-in power storage unit in which power is supplied by the built-in power storage unit when city power is interrupted, and light intensity of the light source of the illumination device is gradually dimmed by the control conducted from a gradual-dimming light intensity drive control unit.

2. Brief Description of Prior Art

Illumination lamp has been used to provide enough light intensity in dark, dim or light-inadequate place so that people can conduct activity smoothly. However, casual maintenance on power supply equipment conducted by power supplier or natural or artificial damage happened on power supply equipment often result in power interruption. In this case, people accidentally entrapped in the environment of completely dark, dim or insufficient illumination are apt to feel uneasy, even are vulnerable.

Therefore, an emergency light has been designed as a measure which is supplied with power from its interconnected charging device. However, this emergency light is not integrated with the indoor illumination lamp so that consumer has to buy it at additional expense. Since the emergency light has to be installed inside the house, inconvenience maybe happened, what is more, the total indoor space planning is also negatively influenced.

Moreover, an illumination unit including power supplying element inside is disclosed in US Patent Application No. 2009039788(A1) in which power is supplied to the light emitting unit in case of power interruption. The illumination unit has a light emitting device comprising (a) a power source input end for receiving external power came from outside power source; (b) a solid state light emitting element connected to the power source input end; and (c) a backup power source connected to the solid state light emitting element, which can supply power to the solid state light emitting element when the solid state light emitting element is unable to receive power from the power source input end. However, the solid state light emitting element in this structure provides light for illumination in stable luminance manner such that it consumes more power. Thus, the power stored in the backup power source will soon be consumed up in short period so that user is unable to cope with the power interruption with sufficient time.

Otherwise, there is a product sold in the market that is added with a delay circuit for delay the timing of lamp's turn-off under the state of switching the power switch to 'OFF' such that user has a buffer period before light extinguishing. However, when the illumination lamp with this structure delays the illumination, the illumination lamp is also used to illuminate space with the same luminance as that generated by city power normally. There is still a possibility of light turn-off by accidental power interruption such that people accidentally entrapped in the environment of completely dark, dim or insufficient illumination are apt to feel uneasy, even are vulnerable.

SUMMARY OF THE INVENTION

The main object of the present invention is to provide an illumination device of gradual dimming after power interruption in which the illumination device has a built-in power storage unit and is connected with a gradual-dimming light intensity drive control unit such that the built-in power storage unit can supply the required power on time when city power is interrupted, and the light intensity of the light emitting source of the illumination device can be gradually dimmed from lighting by the adjustment and control of the gradual-dimming light intensity drive control unit. In this manner, the effect of energy saving and extension of illumination time can be obtained such that eyes of human being can adapt to the light intensity change. In addition, the illumination device is safe and is convenient in use without any indoor wiring change or additional member added.

In order to achieve the above object, this invention provides an illumination device of gradual dimming after power interruption in which a built-in power storage unit and a gradual-dimming light intensity drive control unit are provided within the lamp body, the light emitting source of the illumination device being normally lightened by externally connected city power and the built-in power storage unit being charged by the city power simultaneously. When city power is interrupted, the power is switched to be supplied with the power coming from the built-in power storage unit and the gradual-dimming light intensity drive control unit is activated to control the gradual dimming of light intensity of the light emitting source.

Further, the built-in power storage unit described in the illumination device of gradual dimming after power interruption of the present invention is a battery or a capacitor.

Further, the profile of the lamp body in the illumination device of gradual dimming after power interruption of the present invention is of a plate type, a tube type or a bulb type.

DETAILED DESCRIPTION OF THE PREFERRED EMBODIMENTS

The key point in the design of the illumination device of gradual dimming after power interruption of the present invention is mainly that a built-in power storage unit and a gradual-dimming light intensity drive control unit are provided within the lamp body, the built-in power storage unit being electrically connected with the gradual-dimming light intensity drive control unit and the light emitting source circuit of the lamp body, the light emitting source of the illumination device being normally lightened by externally connected city power and the built-in power storage unit being charged by the city power simultaneously. When city power is interrupted, the power is switched to be supplied with the power coming from the built-in power storage unit and the gradual-dimming light intensity drive control unit is activated to control the gradual dimming of light intensity of the light emitting source.

The objects, the technical contents and the expected effectiveness of the present invention will become more apparent from the detailed description of the preferred embodiment in conjunction with the accompanying drawings.

Figure 1:
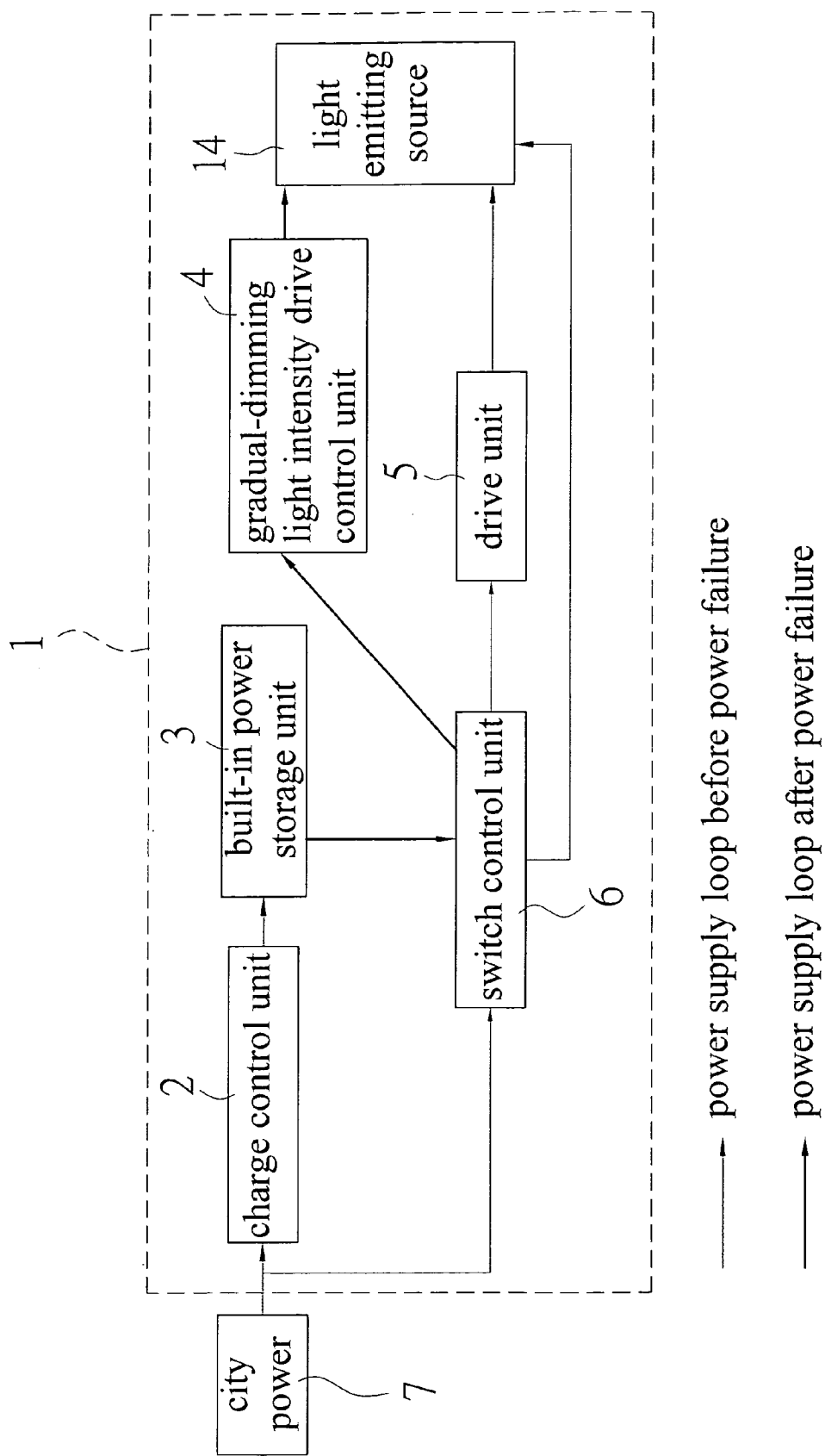
FIG. 1 is a schematic block view showing the structure of the illumination device of gradual dimming after power interruption of the present invention.

In FIG. 1, a schematic view of the illumination device of gradual dimming after power interruption of the present invention is shown in block diagram. The illumination device comprises a lamp body (1), a charge control unit (2), a built-in power storage unit (3), a gradual-dimming light intensity drive control unit (4), and a switch control unit (6).

Figure 2:
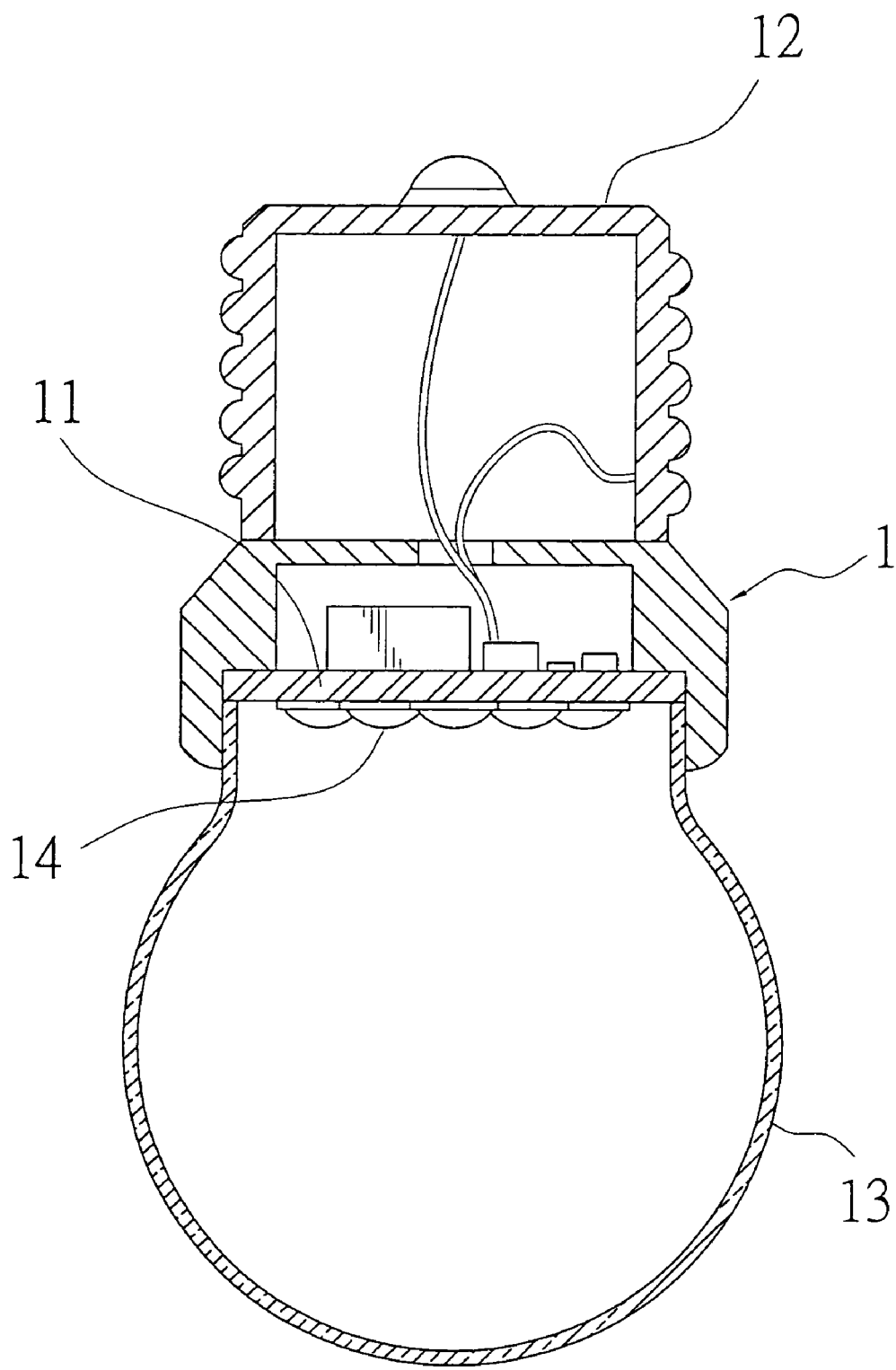
FIG. 2 is a schematic view showing the structure of the illumination device of gradual dimming after power interruption of the present invention applied in the lamp body of bulb type.
Figure 3:
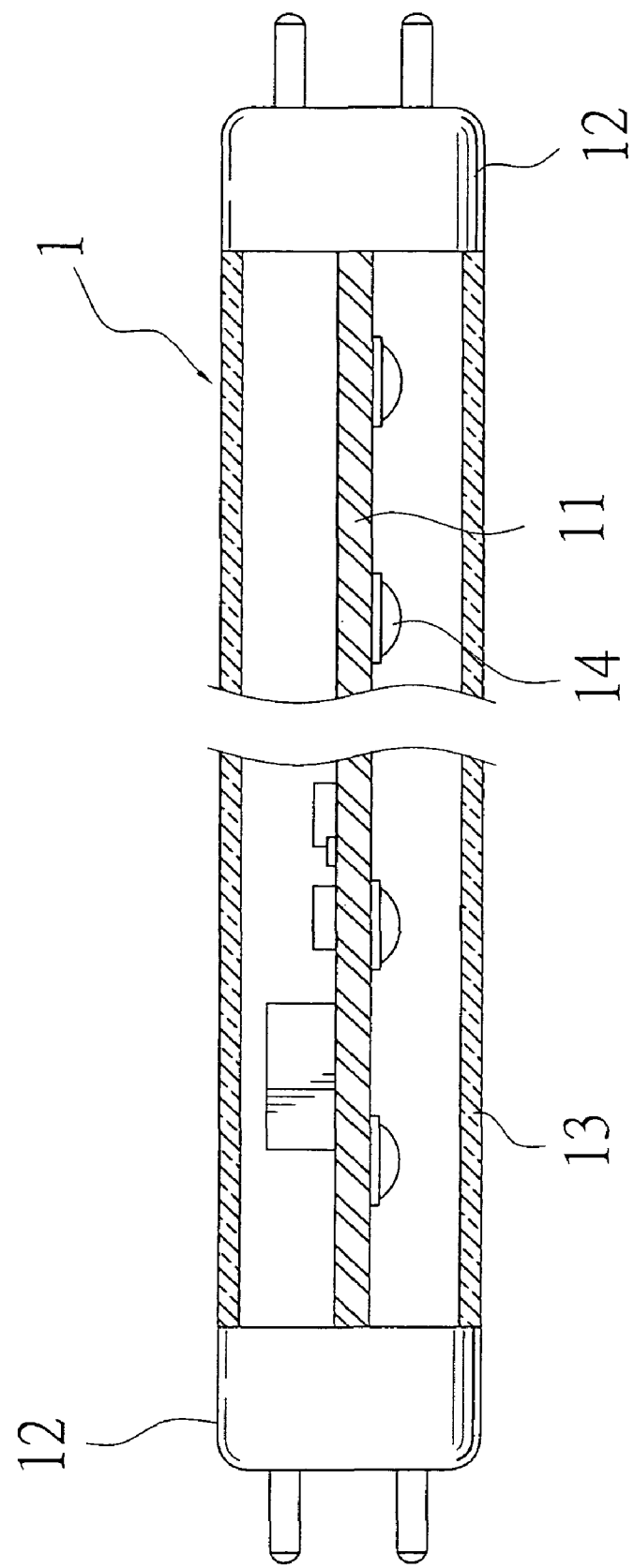
FIG. 3 is a schematic view showing the structure of the illumination device of gradual dimming after power interruption of the present invention applied in the lamp body of tube type.

The lamp body (1) comprises at least a base plate (11), an electrode socket (12), a lamp hood (13) and a light emitting source (14). The lamp body (1) can be a bulb type as shown in FIG. 1 in which the base plate (11) is provided between the electrode socket (12) and the lamp hood (13), the light emitting source (14) being provided on the base plate (11). The lamp body (1) can be a tube type as shown in FIG. 2 in which the lamp hood (13) is provided between two electrode sockets (12), the base plate (11) being provided in the lamp hood (13), the light emitting source (14) being provided on the base plate (11).

Figure 4:
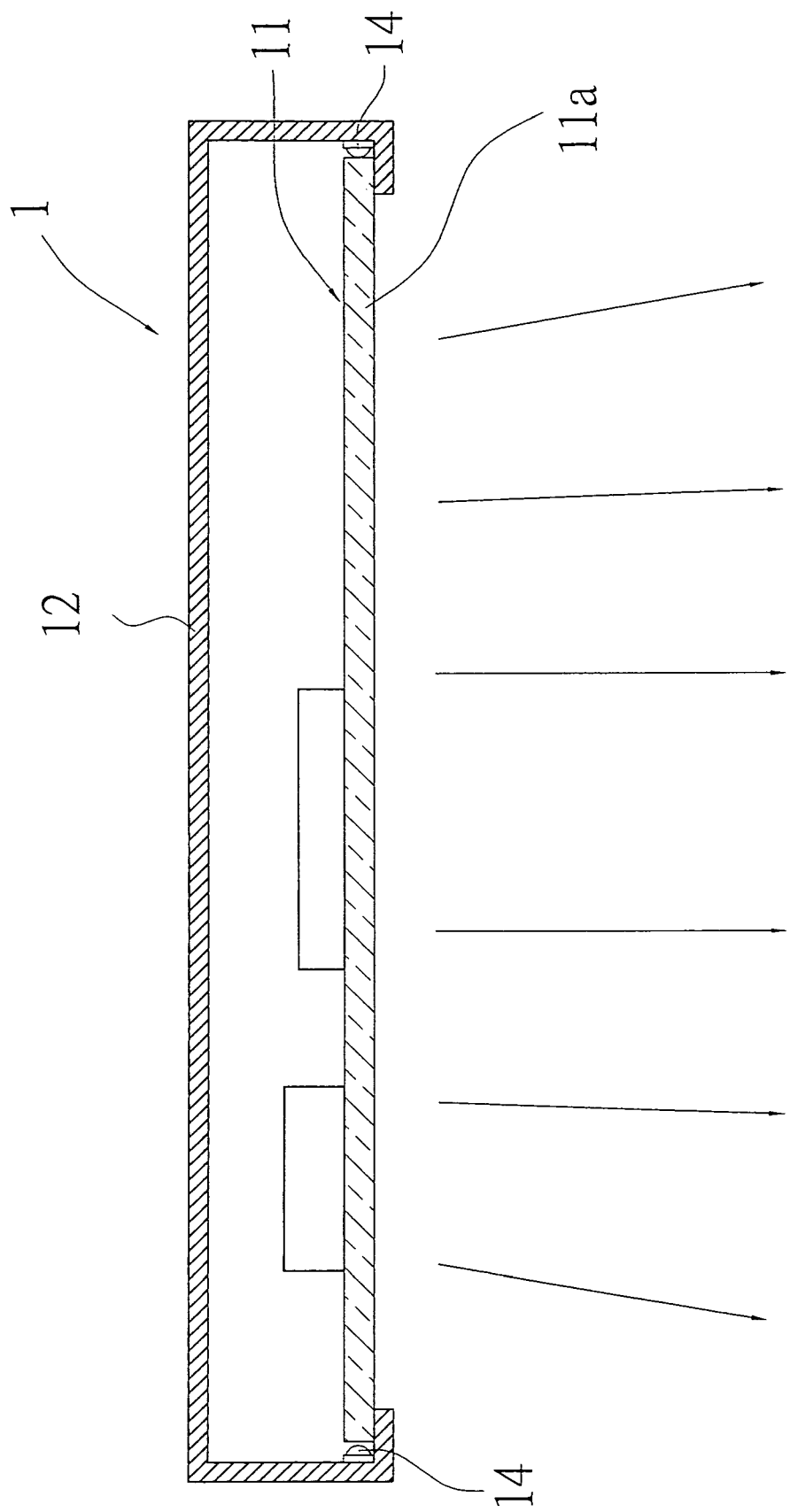
FIG. 4 is a schematic view showing the structure of the illumination device of gradual dimming after power interruption of the present invention applied in the lamp body of plate type and the base plate of the lamp body is a light guiding plate.
Figure 5:
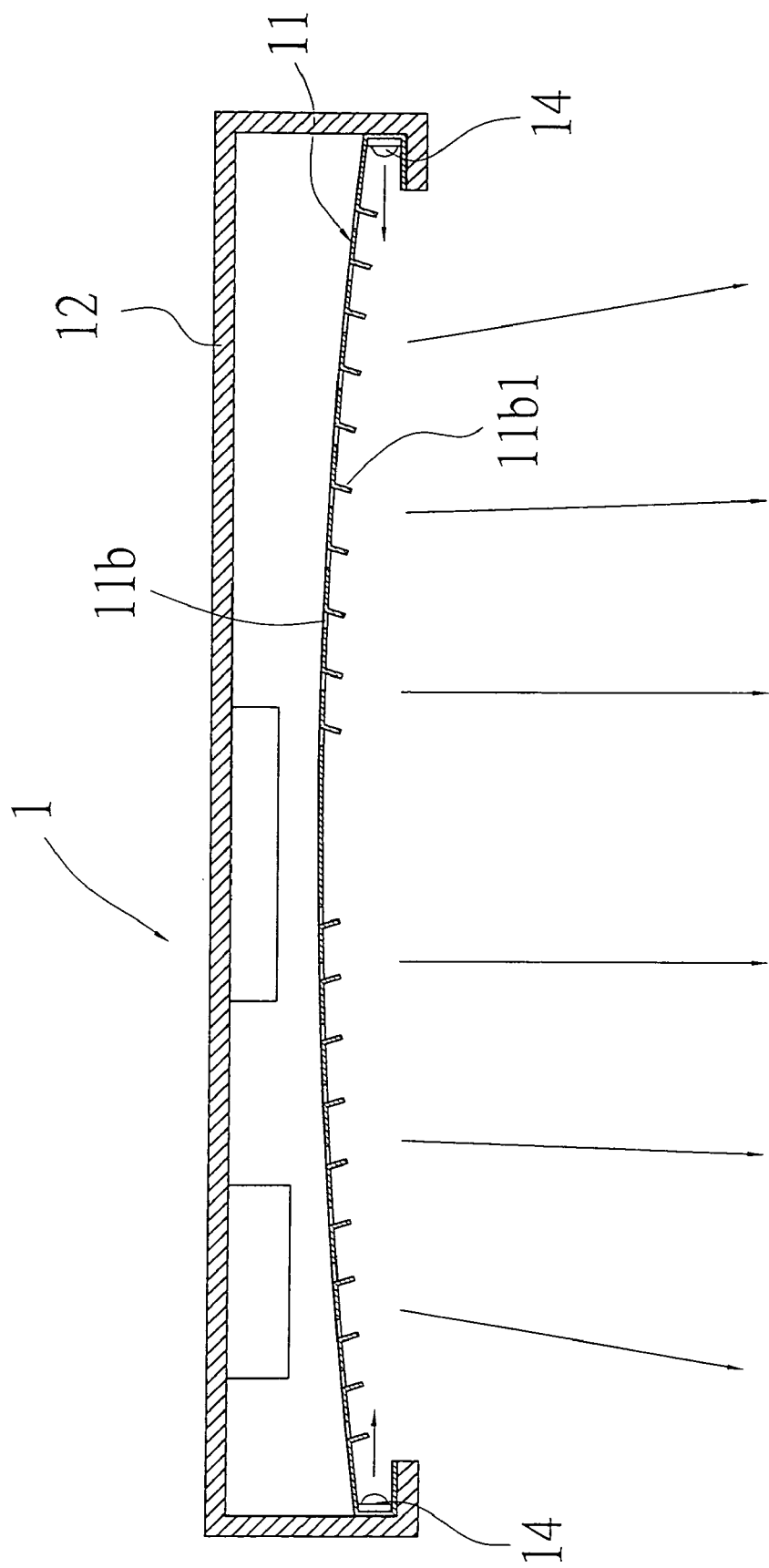
FIG. 5 is a first schematic view showing the structure of the illumination device of gradual damming after power interruption of the present invention applied in the lamp body of plate type and the base plate of the lamp body is a thin aluminum plate.
Figure 6:
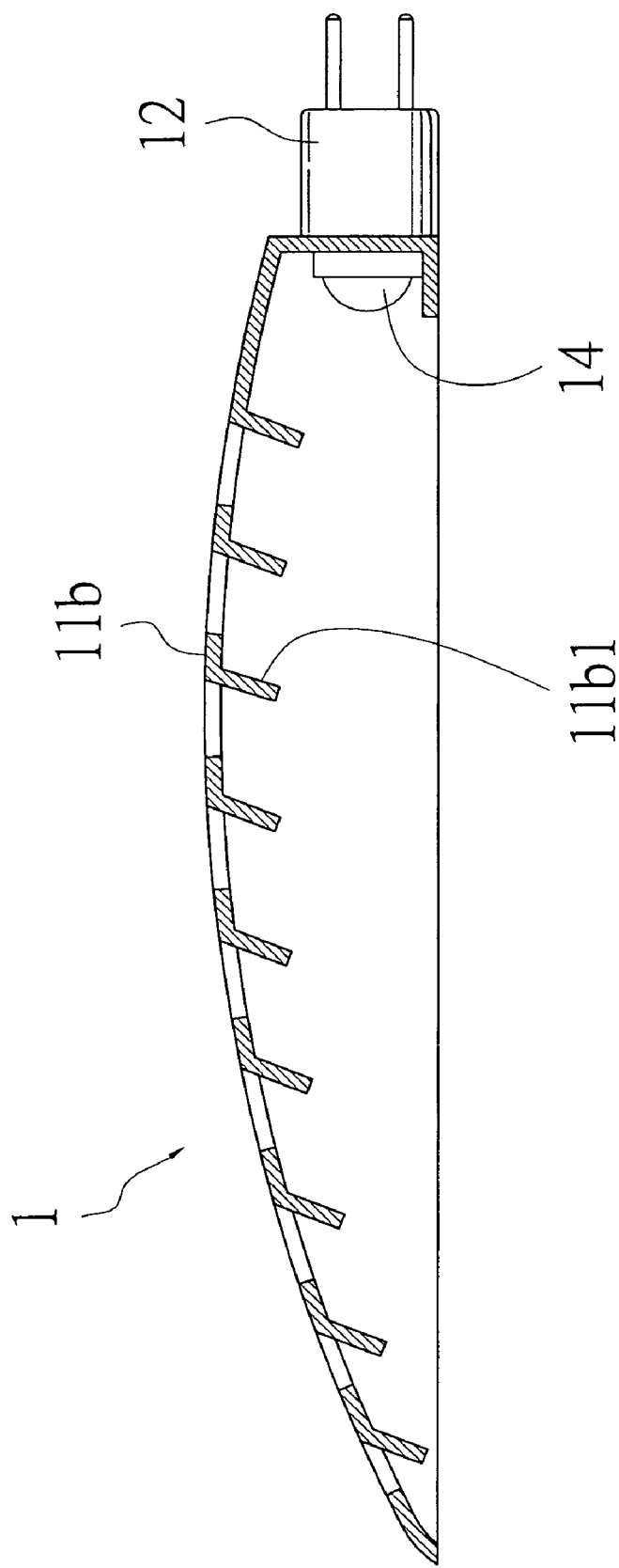
FIG. 6 is a second schematic view showing the structure of the illumination device of gradual dimming after power interruption of the present invention applied in the lamp body of plate type and the base plate of the lamp body is a thin aluminum plate.

Moreover, the lamp body (1) of the present invention can be a plate type as shown in FIGS. 4, 5 and 6. The base plate (11) of the lamp body (1) is a light reflection plate and the light emitting source (14) is provided at least on one side of the light reflection plate, the light reflection plate and the light emitting source (14) being fixed by the electrode socket (12).

The light reflection plate is a light guiding plate (11a) as shown in FIG. 4, or a thin aluminum plate (11b) as shown in FIGS. 5 and 6. The thin aluminum plate (11b) has a curvature either convex or concaved. A plurality of reflection fins (11b1) are formed on the thin aluminum plate (11b) by pressing process so as to reflect the light irradiated from the light emitting source (14) to expected region.

Further, the charge control unit (2), the built-in power storage unit (3), the gradual-dimming light intensity drive control unit (4) and the switch control unit (6) are provided on the base plate (11) and form an electronic loop with the light emitting source (14). The built-in power storage unit (3) can be a battery or a capacitor. Moreover, the illumination device of the present invention further has a drive unit (5) on the base plate (11), and the drive unit (5) forms an electronic loop with the charge control unit (2), the built-in power storage unit (3), the gradual-dimming light intensity drive control unit (4) and the switch control unit (6).

When in use, the switch control unit (6) detects the status of power supply of city power (7). In the case of uninterruption of city power (7), the switch control unit (6) switches the illumination device to the mode of using city power (7) so that the light emitting source (14) is driven through the drive unit (5) or is directly driven to emit light stably. Simultaneously, the built-in power storage unit (3) built in the lamp body (1) is charged by the city power (7) through the charge control unit (2). Charging in the built-in power storage unit (3) is stopped by the control of the charge control unit (2) on the city power (7) when the charging in the built-in power storage unit (3) becomes saturated. When city power (7) is interrupted, the switch control unit (6) switches the illumination device to the mode of using the power coming from the built-in power storage unit (3). In this case, the light intensity of the light emitting source (14) is adjusted and controlled by the gradual-dimming light intensity drive control unit (4) such that the light intensity of the light emitting source (14) can be gradually turned into dark.

Further speaking, the gradual-dimming light intensity drive control unit (4) can control the light emitting source (14) to produce a signal of power interruption before allowing the light emitting source (14) to be gradually turned into dark, and the signal of power interruption can be either flashing at least one time or attenuation of the original brightness into a certain brightness for the light emitting sources. When the city power (7) is interrupted, users can be notified of the power interruption for the time being by the aforesaid advance flashing at least one time or attenuation of the original brightness of the light emitting source (14) into a specific brightness. After the power interruption comes over, the light emitting source (14) will start to turn into dark.

Based on the foregoing, the present invention has the following advantages.

1. Inasmuch as the illumination device of gradual dimming after power interruption of the present invention has a built-in power storage unit and a gradual-dimming light intensity drive control unit already built inside, users can replace the old illumination device directly with the device of the present invention without changing indoor wiring. Therefore, it is very convenient in use.

2. Inasmuch as the illumination device of gradual dimming after power interruption of the present invention has a built-in power storage unit and a gradual-dimming light intensity drive control unit already built inside, the light emitted from the light emitting source can be controlled by the gradual-dimming light intensity drive control unit to turn into dark gradually. Therefore, energy consumption is reduced so as to obtain energy-saving effect. The time of power supply from the built-in power storage unit can be extended such that sufficient buffer time can be provided before light turning-off.

3. Moreover, inasmuch as the illumination device of gradual dimming after power interruption of the present invention uses gradual light turning-off means, user's eyes can be adapted and adjusted to match the dimming speed of the light intensity of the illumination device of gradual dimming after power interruption. Therefore, people's eyes in complete dark feeling due to the slower reactivity of the pupil to the sudden change from bright to dark can be avoided.

4. Due to the gradual-dimming light intensity drive control unit in the present application capable of controlling the light emitting source to produce a signal of power interruption, before allowing the light emitting source to be gradually turned into dark, users will be notified of the power interruption for the time being by the aforesaid function as the city power is interrupted.

Summing up above, the embodiment of the illumination device of gradual dimming after power interruption of this invention can reach expected effectiveness, and the specific configurations disclosed herein have yet not been seen in the prior art of the same category of product, even has not been opened to the public before application.

What is claimed is:

1. An illumination device of gradual dimming after power interruption, comprising:

a charge control unit, a built-in power storage unit, a gradual-dimming light intensity drive control unit, a switch control unit, and a light emitting source are provided in a lamp body, wherein:

the built-in power storage unit is coupled to the charge control unit to be charged by city power therethrough, the switch control unit being coupled to select between city power and the built-in power storage unit for powering the light emitting source;

in the case of uninterruption of city power, the switch control unit switches the illumination device to a first mode using city power for driving the light emitting source to emit light stably, the built-in power storage unit being simultaneously charged by the city power through the charge control unit;

in the case of city power interruption, the switch control unit responsively switches the illumination device to a second mode using power from the built-in power storage unit for driving the gradual-dimming light intensity drive control unit, a light intensity of the light emitting source being thereafter adjusted and controlled by the gradual-dimming light intensity drive control unit such that the light emitting source is progressively reduced in light intensity to be gradually turned off.

2. An illumination device of gradual dimming after power interruption as claimed in claim 1, wherein a profile of the lamp body is selected from a plate type, a tube type or a bulb type.

3. An illumination device of gradual dimming after power interruption as claimed in claim 2, wherein the lamp body of bulb type comprises at least a base plate, an electrode socket, a lamp hood and a light emitting source, the base plate being provided between the electrode socket and the lamp hood and the light emitting source being provided on the base plate.

4. An illumination device of gradual dimming after power interruption as claimed in claim 2, wherein the lamp body of tube type comprises at least a base plate, an electrode socket, a lamp hood and a light emitting source, the lamp hood being provided between two electrode sockets, the base plate being provided in the lamp hood, the light emitting source being provided on the base plate.

5. An illumination device of gradual dimming after power interruption as claimed in claim 2, wherein the lamp body of plate type comprises a light reflection plate, a light emitting source provided on at least one side of the light reflection plate, and an electrode socket housing the light reflection plate and the light emitting source.

6. An illumination device of gradual dimming after power interruption as claimed in claim 5, wherein the light reflection plate is a light guiding plate.

7. An illumination device of gradual dimming after power interruption as claimed in claim 5, wherein the light reflection plate is a thin aluminum plate.

8. An illumination device of gradual dimming after power interruption as claimed in claim 7, wherein said thin aluminum plate has a curvature either in convex or concaved shape.

9. An illumination device of gradual dimming after power interruption as claimed in claim 8, wherein a plurality of reflection fins are provided on the thin aluminum plate by pressing process.

10. An illumination device of gradual dimming after power interruption as claimed in claim 1, wherein said built-in power storage unit is either a battery or a capacitor.

11. An illumination device of gradual dimming after power interruption as claimed in claim 1, further comprising a drive unit connected between the switch control unit and the light emitting source, the light emitting source being driven to emit light stably through the drive unit when the illumination device is in the first mode.

12. An illumination device of gradual dimming after power interruption as claimed in claim 11, wherein a profile of the lamp body is selected from a plate type, a tube type or a bulb type.

13. An illumination device of gradual dimming after power interruption as claimed in claim 12, wherein the lamp body of bulb type comprises at least a base plate, an electrode socket, a lamp hood and a light emitting source, the base plate being provided between the electrode socket and the lamp hood and the light emitting source being provided on the base plate.

14. An illumination device of gradual dimming after power interruption as claimed in claim 12, wherein the lamp body of tube type comprises at least a base plate, an electrode socket, a lamp hood and a light emitting source, the lamp hood being provided between two electrode sockets, the base plate being provided in the lamp hood, the light emitting source being provided on the base plate.

15. An illumination device of gradual dimming after power interruption as claimed in claim 12, wherein the lamp body of plate type comprises a light reflection plate, a light emitting source provided on at least one side of the light reflection plate, and an electrode socket housing the light reflection plate and the light emitting source.

16. An illumination device of gradual dimming after power interruption as claimed in claim 15, wherein the light reflection plate can be either a light guiding plate or a thin aluminum plate.

17. An illumination device of gradual dimming after power interruption as claimed in claim 16, wherein said thin aluminum plate has a curvature either in convex or concaved shape.

18. An illumination device of gradual dimming after power interruption as claimed in claim 17, wherein a plurality of reflection fins are provided on the thin aluminum plate by pressing process.

19. An illumination device of gradual dimming after power interruption as claimed in claim 11, wherein said built-in power storage unit is either a battery or a capacitor.

20. An illumination device of gradual dimming after power interruption as claimed in claim 1, said gradual-dimming light intensity drive control unit controlling said light emitting source to produce a signal of power interruption before controlling said light emitting source to be gradually turned off, and said signal of power interruption being either flashing of emitted light at least one time or attenuation of the emitted light in brightness.

* * * * *